Feb. 4, 1964　　H. J. GERMANN　　3,120,022
ADJUSTABLE SPACER

Filed Jan. 27, 1961　　2 Sheets-Sheet 1

INVENTOR
Herbert J. Germann
BY
Wayne B. Easton

Feb. 4, 1964 H. J. GERMANN 3,120,022
ADJUSTABLE SPACER

Filed Jan. 27, 1961 2 Sheets-Sheet 2

INVENTOR
Herbert J. Germann
BY
Wayne B. Easton

United States Patent Office 3,120,022
Patented Feb. 4, 1964

3,120,022
ADJUSTABLE SPACER
Herbert J. Germann, Three Rivers, Mich., assignor to Studebaker-Packard Corporation, South Bend, Ind., a corporation of Michigan
Filed Jan. 27, 1961, Ser. No. 85,327
4 Claims. (Cl. 16—86)

This invention relates to a device which is referred to herein in general sense as an adjustable spacer.

The invention can be embodied in various types of devices which utilize an adjustable spacing function in connection with some specific ultimate function for which the device is designed. An example of a type of device which might embody the invention would be a bumper of the kind used as a stop for a closure member, such as a door or an automobile hood, and for cushioning the closure member as it approaches and when it is in its closed position. An example of another type of device which might embody the invention would be an anti-rattle device used for windows which are moveable up and down and upon which the device exerts a resilient biasing force to prevent rattling of the window.

The effective height of the adjustable spacer to which the present invention pertains is adjustable with respect to the surface of a slotted member in which the adjustable spacer is detachable inserted. Although the adjustable spacer is illustrated herein as taking the form of a bumper for an automobile hood closure member, it will be apparent that it is of universal use for devices of various kinds in which the adjustable spacing feature is desired or required.

A main object of the invention is to provide a new and improved adjustable spacer of the type referred to herein which is simple in construction, has ease of operation, and is inexpensive to manufacture.

Other objects of the invention will become apparent from the following specification, the drawings relating thereto, and the appended claims.

Figure 1:
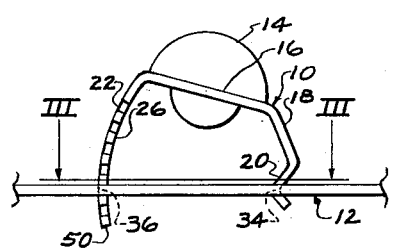
FIG. 1 is a side elevational view of an embodiment of the new and improved adjustable spacer made in accordance with the present invention which is illustrated as being embodied in an adjustable bumper assembly in which a bumper member is inserted in a slotted member adapted to receive it.
Figure 2:
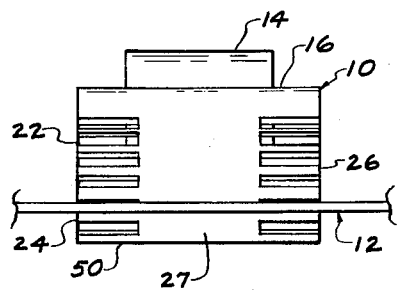
FIG. 2 is a front elevational view of the bumper assembly shown in FIG. 1.
Figure 3:
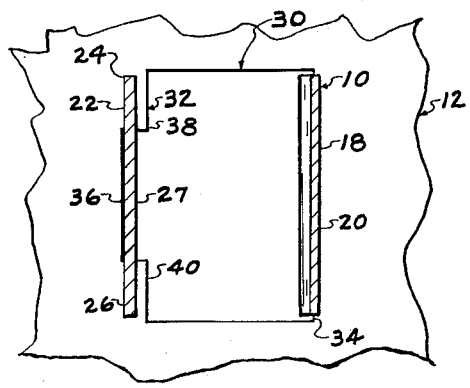
FIG. 3 is a top sectional view of the bumper assembly which is taken on line III—III of FIG. 1.

Referring to the drawings, the assembly shown comprises an adjustable spacer member which is illustrated as a bumper 10, a slotted plate member 12 in which bumper 10 is insertable and a buffer 14 made of rubber or the like which is attachable to the bumper 10. A slot 15 may be provided on the top side of bumper 10 to facilitate the attachment of buffer 14 or it could be attached in a variety of other ways if desired.

Bumper 10 is generally trough shaped and has three main portions to which reference is made for convenience but which are not necessarily sharply defined portions. These portions are (1) a crest portion 16 upon which the buffer 14 is mounted, (2) a hinge portion 18 having a hook 20 adapted to be hooked onto the slotted plate member 12, and (3) a tooth portion 22 having on opposite sides thereof two rows of teeth 24 and 26 with the two rows being separated by a center abutment portion 27.

Figure 4:
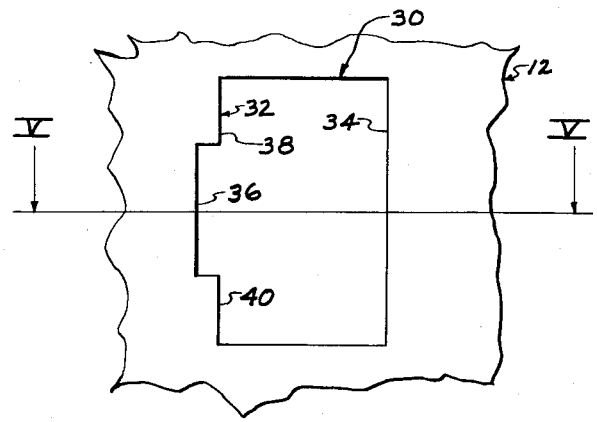
FIG. 4 is a top view of the slotted plate member in which the bumper is insertable.
Figure 6:
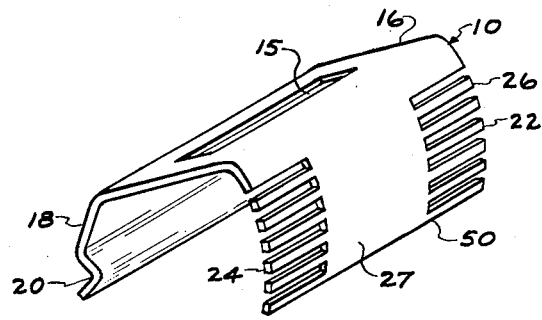
FIG. 6 is an isometric view of the bumper.

Slotted plate member 12 may be an integral part of the apparatus such as an automobile on which the bumper 10 is to be used or it may be a separate piece in the form of a bracket or plate. As best seen in FIG. 4, slotted plate member 12 has an opening or slot 30 and the two sides thereof which the bumper 10 comes in contact with are a fastening side 32 and a hinge side 34. Fastening side 32 has a recessed portion 36 which is parallel to and recessed relative to hinge side 34 and, by reason of being recessed, there are formed two flanges 38 and 40 which are offset relative to recess portion 36.

Although only one slot 30 is illustrated, it is apparent that separate slots could be provided for hinge portion 18 and toothed portion 22 without affecting the operativeness of the invention.

Figure 5:
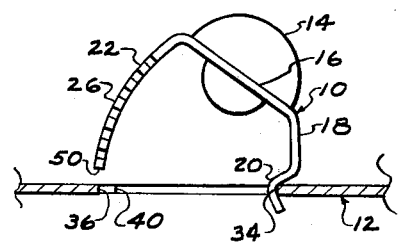
FIG. 5 is a side elevational view of the bumper shown partially inserted in the slotted plate member, the plate member being shown in a section taken on line V—V of FIG. 4.

As best seen in FIGS. 1 and 5, the hook 20 of the bumper 10 hooks onto the hinge side 34 of the slot 30 of the slotted plate member 12 and makes line contact therewith. The toothed portion 22 is cylindrically shaped and, when the bumper 10 is inserted in the slotted member 12 as shown in FIG. 1, cylindrically shaped tooth portion 22 has its axis coincident with the line of contact between hook 20 and the hinge side 34 of the slot 30.

FIG. 5 shows toothed portion 22 of bumper 10 just prior to it being inserted into the slot 30. The insertion is accomplished by firstly applying a radial force to bend toothed portion 22 towards hook 20 a sufficient distance to permit the lower edge 50 of portion 22 to clear side 32 of the slot and, secondly, by rotating the bumper 10 about the hinge side 34 of the slot in a counterclockwise direction to a desired adjusted position. In a preferred form of the invention, the lower edge 50 of toothed portion 22 is slightly farther from the hinge side 34 of the slot than is the recessed edge portion 36, when bumper 10 is in its expanded or non-inserted position as shown in FIG. 5. The bumper 10 is preferably made of a material having resilient properties such as spring metal or a plastic and, when the bumper is in its inserted position as shown in FIG. 1, the center portion 27 of toothed portion 22 may, if desired, be resiliently biased against the recessed edge 36 of the slot. Concomitantly therewith, a pair of teeth in row 24 will straddle flange 38 of the slotted member 12 and a corresponding pair of teeth in row 26 will straddle flange 40 of the slotted member 12. While the resilient biasing of the center portion 27 of toothed portion 22 against recessed edge 36 of the slot may be desirable in most installations, it is not absolutely essential within the scope of the invention.

With regard to dimensions, the width of bumper 10 is preferably slightly less than the width of the slot 30. The width of the center portion 27 between the rows of teeth 24 and 26 is preferably only slightly less than the width of the recessed portion 36 of the slotted member 12. The spaces between adjacent teeth in the rows 24 and 26 are respectively slightly larger than the thickness of the slotted plate member 12 to permit the interlocking engagement described.

It will be understood from the above description that within limits bumper 10 may be set in any adjusted position so that buffer 14 is at a desired height. If the wearing away of buffer 14 causes the effective height of the assembly to be reduced, bumper 10 can be readjusted to restore the original effective height.

Buffer 14 can be replaced by different types of face pieces depending on the use to which the adjustable spacer device is to be put. If the adjustable spacer is to be used as an anti-rattle device for windows that move up and down, for example, buffer 14 could be replaced by a resiliently mounted, cylindrically shaped rubber roller member having an axis parallel to the line of contact between hook 20 and the side 34 of slot 30.

The invention may be embodied in other specific forms without departing from the spirit of essential characteristics thereof. The embodiment of the invention described and shown is therefore to be considered in all respects as illustrative and not restrictive, and the scope of the invention being indicated by the appended claims rather than by the foregoing description, and all changes which come within the meaning and range of equivalency of the claims are therefore intended to be embraced therein.

It is claimed and desired to secure by Letters Patent:

1. An adjustable spacer made of resilient sheet material and being adapted to be inserted into a slotted member made of a sheet material, said slotted member having a slot formed with a hinge side and a fastening side, said fastening side having a middle recessed portion parallel to and spaced a predetermined distance from said hinge side and flange portions on opposite sides of said recessed portion, said spacer being generally trough shaped and having crest portion with toothed and hinge portions on opposite sides thereof, said hinge portion having a hook adapted to hook said hinge side of said slotted member and have line contact engagement therewith, said toothed portion being cylindrically shaped with the axis thereof being coincident with said line contact when said spacer is in an inserted position and the radius thereof being approximately equal to said predetermined distance, a row of teeth on each side of said toothed portion with the adjacent teeth in each row being spaced apart a distance slightly greater than the thickness of said slotted member and with the two rows of teeth being spaced apart by a center portion having a width less than the width of said recessed portion, said center portion being in resilient biasing engagement with said recessed portion of said fastening side when said spacer is in its inserted position, and said teeth being in adjusted straddling relation with respect to said flange portions when said spacer is in its inserted position.

2. An adjustable spacer made of resilient sheet material and being adapted to be inserted into a slotted member made of a sheet material, said slotted member having a slot formed with a hinge side and a fastening side, said fastening side having a recessed portion and flange means adjacent to said recessed portion, said spacer being generally trough shaped and having a crest portion with toothed and hinge portions on opposite sides thereof, said hinge portion having a hook adapted to hook said hinge side of said slotted member, said toothed portion being cylindrically shaped with the axis thereof extending through said hinge portion, and said toothed portion having an abutting section for abutting engagement with said recessed portion and a row of teeth attached to said abutting section which straddle said flange means when said bumper is in its inserted position.

3. An adjustable spacer made of resilient sheet material and being adapted to be inserted into a slotted member made of a sheet material, said slotted member having a slot formed with a hinge side and a fastening side, said fastening side having a recessed portion and flange means, said spacer being generally trough shaped and having a crest portion with toothed and hinge portions on opposite sides thereof, said hinge portion being adapted to hook said hinge side of said slotted member, said toothed portion having an abutting section adapted to be resiliently biased against said recessed portion of said slotted member, said toothed portion being cylindrically shaped with the axis thereof extending through said hinge portion, and said toothed portion having a row of teeth attached to said abutting section with each pair of adjacent teeth being spaced apart a distance slightly greater than the thickness of said slotted member and being adapted to straddle said flange means when said spacer is in its inserted position.

4. An adjustable spacer made of resilient sheet material and being adapted to be inserted into a slotted member made of a sheet material, said slotted member having a slot formed with a hinge side and a fastening side, said fastening side having a recessed portion which is recessed relative to said hinge side and a nonrecessed flange portion adjacent said flange portion, said spacer being generally trough shaped and having a crest portion with toothed and hinge portions on opposite sides thereof, said hinge portion having a hook adapted to hook said hinge side of said slotted member and have line contact engagement therewith, said toothed portion being cylindrically shaped with the axis thereof being coincident with said line contact when said spacer is in an inserted position, said toothed portion having an abutment section of lesser width than said recessed portion for abutting engagement with said recessed portion, a row of teeth attached to said abutment section with the adjacent teeth being spaced apart a distance slightly greater than the thickness of said slotted member, and said teeth being in adjusted straddling relation with respect to said flange portion when said spacer is in its inserted position.

References Cited in the file of this patent

UNITED STATES PATENTS

| | | |
|---|---|---|
| 1,535,113 | Eastman | Apr. 28, 1925 |
| 1,620,414 | Vanderlip | Mar. 8, 1927 |
| 1,624,819 | Wolford | Apr. 12, 1927 |